(No Model.) 2 Sheets—Sheet 1.
O. T. CHAMBERLAIN, A. J. SIGNOR, & S. D. STRAW.
Windmill.
No. 237,483. Patented Feb. 8, 1881.

Attest:
R. F. Barnes
L. W. Luby

Inventor:
Orville T. Chamberlain,
Alfred J. Signor,
Samuel D. Straw,
by Ellis Spear,
Atty.

N. PETERS, PHOTO-LITHOGRAPHER, WASHINGTON, D.C.

(No Model.) 2 Sheets—Sheet 2.
O. T. CHAMBERLAIN, A. J. SIGNOR, & S. D. STRAW.
Windmill.
No. 237,483. Patented Feb. 8, 1881.
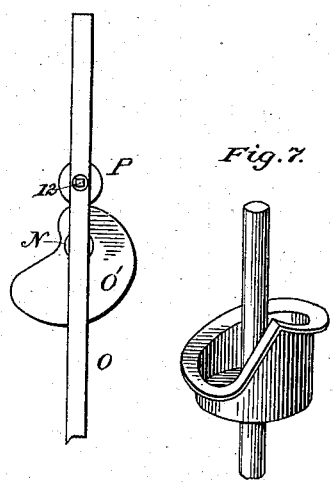
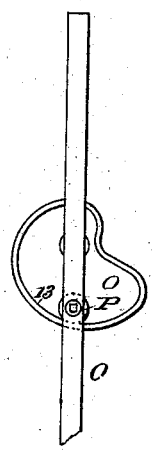
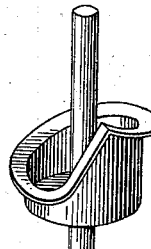
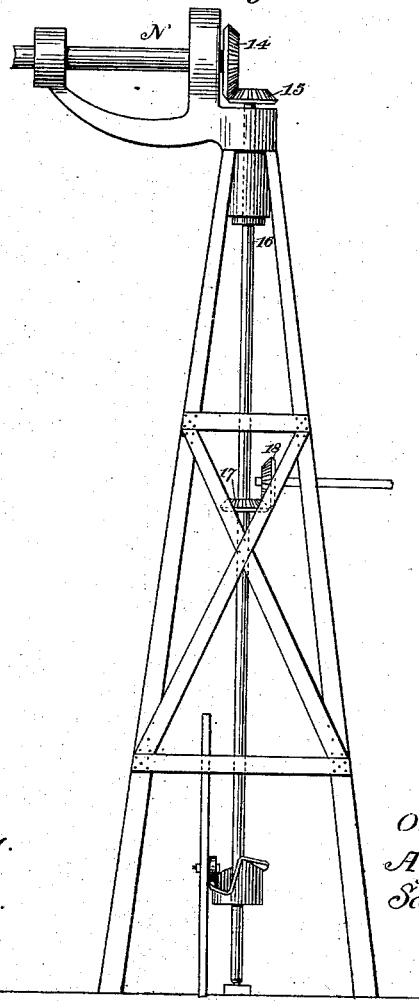
Attest:
R. F. Barnes.
S. W. Luly.
Inventor:
Orville T. Chamberlain,
Alfred J. Signor,
Samuel D. Straw,
by Ellis Spear
Atty.
N. PETERS, PHOTO-LITHOGRAPHER, WASHINGTON, D. C.

UNITED STATES PATENT OFFICE.

ORVILLE T. CHAMBERLAIN, ALFRED J. SIGNOR, AND SAMUEL D. STRAW, OF ELKHART, INDIANA; SAID SIGNOR ASSIGNOR TO SAID CHAMBERLAIN AND STRAW.

WINDMILL.

SPECIFICATION forming part of Letters Patent No. 237,483, dated February 8, 1881.

Application filed September 22, 1880. (No model.)

*To all whom it may concern:*

Be it known that we, ORVILLE T. CHAMBERLAIN, ALFRED J. SIGNOR, and SAMUEL D. STRAW, of Elkhart, in the county of Elkhart and State of Indiana, have invented a new and useful Improvement in Windmills; and we do hereby declare that the following is a full, clear, and exact description of the same.

Our invention relates to the class of windmills having a revolving wheel adapted to supply power for the operation of a pump-rod or other kinds of machinery.

It consists partly in the manner of attaching the fans, whereby they are made self-regulating; further, in the device for throwing all the fans simultaneously out of the wind; further, in the device for communicating the power derived from the revolution of the wheel, and, finally, in the construction and arrangement, and the various combinations of the operative parts, as more fully hereinafter explained.

Figure 1:
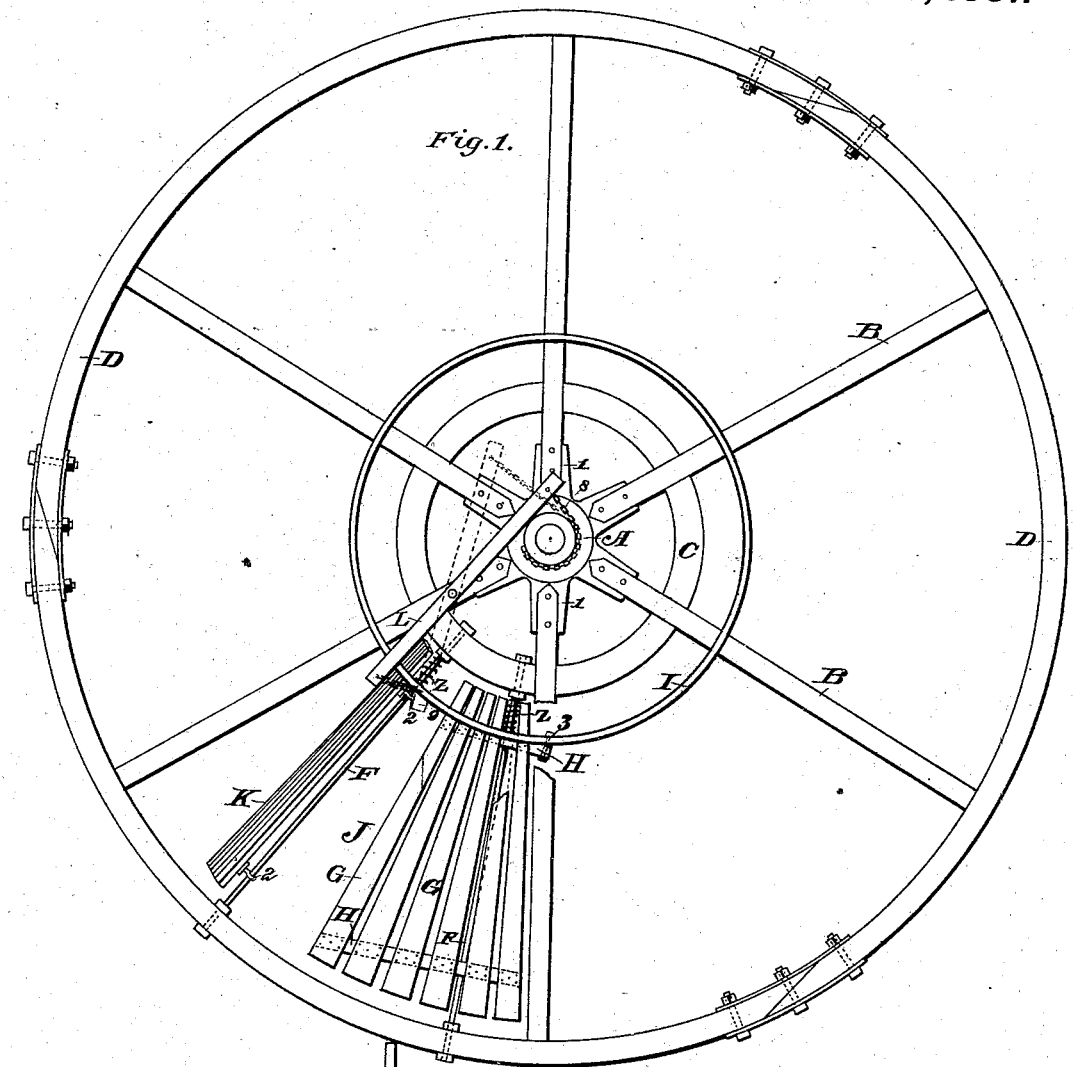
Figure 2:
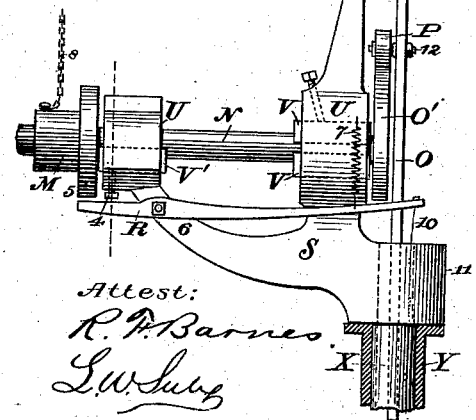
Figure 3:

The accompanying drawings show, in Figure 1, an elevation of the windmill; Fig. 2, a section through the spindle or axle of the wheel; Fig. 3, a section on line *x x*, Fig. 2; Fig. 4, a side view of cam; Fig. 5, a modified form of cam; Fig. 6, another modification; Fig. 7, a separate view of cam shown in Fig. 6.

In these drawings, A represents the hub or spider of the wind-wheel adapted to be secured upon a shaft. It is provided with arms 1 1, to which are bolted the arms B B. The wheel proper is composed of these arms and two circles, C D, the inner circle, C, being mortised into the arms B, while the outer, D, is made in sections, and is either mortised or bolted to the arms or secured by plates overlapping the joints, and bolted or otherwise attached to the adjoining sections.

The fans J are composed of strips G secured to battens H H, though the employment of these strips is not essential, since the fan may be constructed of pieces placed closely together, forming a solid surface. To the battens H are attached, at points off the center of the fan, eyes 2 2, through which passes a rod, F, whose ends are carried through the circles C D and secured by nuts. The fan is thus hung upon the rod F and is free to oscillate. The fans are hung at a slight angle to the motion of the wheel, and are held in this position by a coil-spring, Z, on the rod F, held between the inner circle, C, and the inner batten, to which its other end is attached.

The drawings show only two of these fans; but in practice they would fill the spaces between the arms B entirely around the wheel. K represents a fan as forced out of the wind. It is evident that as the fans are hung off their centers, should the wind increase sufficiently in force to overcome the holding-power of the spring Z, the fan will be forced back, and will consequently present less surface to the wind, while a lessening of the wind-force will enable the springs to bring the fans back in position to present the maximum of surface. The fans are thus automatically adjustable, and a steady motion is thereby imparted to the wheel, however variable the wind.

In the practical operation of the device all the fans will move simultaneously, but for convenience I have shown one fan as in and one as out of the wind. The extent of surface presented to the wind, and consequently the velocity of the wheel, may be also diminished by detaching a sufficient number of the springs Z, the effect being to allow the wind to throw the fans from which said springs are taken out of the wind wholly or partially and more easily.

All the fans are connected together and caused to act in concert, as hereinafter described, by an iron circle, I, which is attached by a bolt, 3, to the projecting end of each of the inner battens, H.

The wheel is rigidly mounted upon a shaft, N. (Shown in section in Fig. 2.) The shaft N runs in boxes U U in the casting S, which boxes are provided with double adjustable removable bearings V V, placed in the rear box U, and a single adjustable removable bearing, V', placed in the outer box. Only one adjustable bearing is required in the outer box, since the weight of the wheel causes the shaft to bear downward at that end. The bearings V V V' are adjusted to compensate for wear by set-screws 4 4, as shown.

M is a loose drum or cylinder on the shaft N, provided with a flange, 5, on which is adapted to bear a brake-lever, R, which is pivoted to the arm 6 of the casting S. The brake is held off the flange when in its normal position by the pressure of a spring, 7.

L is a lever pivoted to one of the arms B of the wind-wheel. At one end is attached a chain, 8, which is also secured to the loose drum M. At the other end of lever L is another short length of chain, 9, which is attached to the circle I. This forms the means of throwing all the fans simultaneously out of the wind, and the operation is as follows:

The pressure of the brake R against the drum (the brake being operated by a cord, 10) stops the drum M, and, as the wind-wheel continues its revolution, causes the chain 8 to wind upon the drum, drawing one end of the pivoted lever L down upon the drum, and causing the other end of such lever to move in the opposite direction. The effect of this last movement is to tighten chain 9, and, as the movement continues, to draw the movable circle I, to which the fans are connected, partially around, thus throwing all the fans at once out of the wind, where they may be held by securing the cord 10. When the cord is released the spring 7 retracts the brake-lever R, and the coil-springs bring the fans back into the wind, thus returning lever L to its former position and unwinding the chain from the drum N.

To the rear end, 11, of the casting S is secured a tube, X, which is slipped into a socket, Y, on top of the tower or derrick, and forms the turn-table.

The part 11 is hollow, and through it and the turn-table reciprocates the pump-rod O, to which motion is given in the following manner: On the inner end of the shaft N is a cam, O', a side view of which is given in Fig. 4. A wheel, P, turning on a shaft, 12, on the pump-rod, moves on the periphery of this cam. It will be seen that from the shape of the cam the wheel P is rising during about four-fifths the revolution of the cam, the remaining fifth being occupied by the comparatively rapid descent of the wheel on the straighter side of the cam. Thus the supply of water is nearly constant. By employment of the cam the motion of the pump-rod is vertical, and hence a very small turn-table only is necessary. By its use, also, as shown, the pressure of the wheel P while being lifted is equal at every point of the cam, thereby allowing the wheel to start in lighter winds than other mills, and the upward motion it communicates to the pump-rod being regular and steady, (so large a proportion of the revolution of the wheel being employed in lifting the pump-rod,) the wheel can revolve at more rapid rate without injury to the pump than can be allowed in other mills, and thus more water can be raised in a given time than can be done by other mills.

In Fig. 5 is shown a side view of a modification of the cam O'. It is here provided with a flange, 13, on the inner periphery of which the wheel P travels.

In order to use our wind-wheel in connection with a geared mill, a bevel-pinion, 14, Fig. 6, is keyed to the inner end of shaft N, engaging with a pinion, 15, which gives a rotary motion to the shaft 16. On this shaft is a pinion, 17, meshing with a pinion, 18, and driving the shafting for the mill. The wheel, while it is used to drive shafting, as just described, may at the same time give the proper reciprocating motion to the pump-rod.

On the shaft 16 is secured a peculiar cam, a separate view of which is given in Fig. 7. The pump-rod works in guides in the frame of the tower, and has a wheel corresponding to wheel P, above described, which travels around the periphery of the cam, and thereby operates the pump-rod.

This windmill requires no rudder, as the fans are automatically kept in the wind, as before described. The advantages of our device will be readily apparent, and require no enumeration.

Having thus described our invention, what we claim is—

1. In a windmill, a series of independently-pivoted fan-sections automatically adjustable on such pivots, and also adapted to be simultaneously thrown out of the wind by power applied to the driving-shaft, and communicated to the sections by means substantially as described.

2. In combination, the drum M, having brake R, the lever L, the chains 8 9, the spring 7, and the fans connected by the movable circle I.

3. In combination with the shaft N and boxes U, the V-shaped inner bearings and the set-screw 4.

4. In combination with the driving-shaft of a windmill and a vertical shaft operated thereby and having a cam, a pump-rod provided with a friction-roller, whereby such pump-rod is vertically reciprocated.

In testimony whereof we have signed our names to this specification in the presence of two subscribing witnesses.

ORVILLE T. CHAMBERLAIN.
ALFRED J. SIGNOR.
SAMUEL D. STRAW.

Witnesses:
CHARLES S. HENDERSON,
ROBERT Q. HAGGERTY.